United States Patent [19]
Sorensen et al.

[11] 3,874,850
[45] Apr. 1, 1975

[54] BLOOD ANALYZING METHOD AND APPARATUS

[75] Inventors: Soren Kai Sorensen, Albertslund; Jorgen Andersen, Herlev; Ebbe Johansen; Jorgen Aage Preben Lund, both of Birkerod, all of Denmark

[73] Assignee: Radiometer A/S, Copenhagen, Denmark

[22] Filed: Nov. 15, 1972

[21] Appl. No.: 306,661

[30] Foreign Application Priority Data
July 24, 1972 Denmark............................ 3662/72

[52] U.S. Cl........... 23/230 B, 23/253 R, 204/195 B, 204/IT, 324/30 R, 324/30 B, 356/40
[51] Int. Cl...................... G01n 27/42, G01n 33/16
[58] Field of Search............... 23/230 B, 253 R, 259; 356/39, 40; 324/30 R, 30 B; 204/195 B, 195 IT

[56] References Cited
UNITED STATES PATENTS
2,763,422   10/1973   MacPhee et al................. 23/230 B OTHER PUBLICATIONS
Gould et al., "Automation in Anal. Chem.," Technicon Symposia, 1966, Vol. 1, pp. 378–382, 1966.

Primary Examiner—R. E. Serwin
Attorney, Agent, or Firm—Robert E. Burns; Emmanuel J. Lobato; Bruce L. Adams

[57] ABSTRACT

An automatic blood sample analyzer for automatically measuring one or more unknown data or parameters of the blood samples, such as partial pressure of carbon dioxide, partial pressure of oxygen, the pH-value, and the hemoglobin concentration, and the analyzer comprises computer means for calculating on the basis of the measured values a number of other parameters including the acid-base status of the blood sample.

The analyzer comprises means for automatically performing calibration measurements on two different calibrating liquids or solutions. One of these solutions may be equilibrated with a gas mixture containing known amounts of $O_2$ and $CO_2$, and the other solution may be equilibrated with a gas mixture containing a known and different amount of at least $CO_2$. The computer means are adapted to receive and store the calibration measurement values and to base the calculations of the latest received set of calibration values.

The analyzer may also comprise means for photometrically measuring the hemoglobin contents of samples of whole blood.

48 Claims, 14 Drawing Figures

BLOOD ANALYZING METHOD AND APPARATUS

BACKGROUND OF THE INVENTION

1. Field of the Invention

The present invention relates to a method and apparatus for analyzing blood in order to determine one or more unknown data or parameters thereof.

In many instances it is very important to obtain reliable information about certain data of blood sample from a patient as soon as possible in order to avoid an unnecessary delay in treating the patient in the most appropriate manner. The data desired may comprise any of the following:

Partial pressure of carbon dioxide in the blood sample — in the following referred to as $PCO_2$, partial pressure of oxygen in the blood sample — in the following referred to as $PO_2$, the pH-value of the blood sample, and the hemoglobin concentrations of the blood sample, e.g. in percentage by weight — in the following referred to as Hgb%.

When a correlated set of values for $PCO_2$, $PO_2$ pH and Hgb% is known it is possible to determine a number of other parameters indicating the acid-base status of the blood sample, such as "buffer base", "base excess", "standard bicarbonate", "actual bicarbonate", "total $CO_2$". The meaning of these terms is defined in applicants' U.S. Pat. No. 3,654,445.

2. Description of the Prior Art

A known apparatus of the type described comprises a single measuring chamber having measuring devices for pH, $PO_2$, and $PCO_2$. The said known apparatus also comprises an electronic calculator adapted to calculate values for "actual bicarbonate" (referred to as $HCO_3-$ in the following specification), "total $CO_2$" (referred to as $TCO_2$ in the following specification) and "base excess" (referred to as BE in the following specification). It is necessary, however, to determine the Hgb% of the blood sample in advance, and the user of the apparatus must manually dial that determined hemoglobin value in on a control of the apparatus. It is vital that the user or the operator of the apparatus remembers to clean or flush the conduit system in the apparatus before another blood sample is introduced. In order to initiate the cleaning operation the user or operator has to depress a button. Furthermore, the user must calibrate the measuring electrodes of the apparatus from time to time by introducing calibrating gases into the system and setting the apparatus manually in a conventional manner.

SUMMARY OF THE INVENTION

The present invention provides a method in analyzing blood and comprising the following steps:

a. passing a blood sample into conduit means provided with measuring devices, such as measuring electrodes, photometric sensing devices, etc., b. measuring values of blood parameters by said devices, said parameters comprising pH, $PCO_2$, and $PO_2$, c. discharging said blood sample from said conduit means, d. passing a rinsing fluid through said conduit means before another sample is passed into it, e. passing at controlled intervals and in succession amounts of at least two calibrating fluids having different sets of values of pH, $PCO_2$, and $PO_2$ through said conduit means, f. measuring said sets of values by the measuring devices, and g. contolling the operational sequence of the steps (b) through (f) by control and computer means, and h. using computer means for storing said sets of calibration values received from said measuring devices and for converting said measured values into easily conceivable units on the basis of the measured calibrating values. The said conversion of values to easily conceivable units is intended to comprise for example conversion of electrical signals received from the measuring devices into easily conceivable or readable units for the parameters measured, such as pH, $PCO_2$ and $PO_2$, as well as units derived from one or more of said parameters and normally used within the specific medical field, such as BE, $TCO_2$, $HCO_3-$, etc.

According to the invention the parameters being measured may also comprise the hemoglobin contents of the blood, and it has been found that the measurement of the hemoglobin contents may be performed on whole blood by means of a photometric sensing device. The computer in the analyzer may then be adapted to calculate and display any of the parameters mentioned above, the calculation being performed on the basis of the measured set of correlated values of $PCO_2$, $PO_2$, pH and Hgb%.

The calibrating fluids used in the method according to the invention may comprise a first liquid or solution equilibrated with a gas mixture containing known amounts of $O_2$ and $CO_2$, and a second liquid or solution equilibrated with a gas or gas mixture containing a known, but different amount of $CO_2$. Provided that the gas pressure to which the calibrating liquids are exposed, as well as the composition of the solutions are known the values of pH, $PCO_2$, and $PO_2$ may be calculated by using known formulae. The total gas pressure to which the calibrating liquids are exposed is normally equal to atmospheric pressure and may therefore change. Consequently, the said total gas pressure is preferably currently measured, and the pH, $PO_2$ and $PCO_2$ values of the said first and second calibrating fluids may then, as explained above, be calculated by said computer means on the basis of said currently measured gas pressure, the relative amounts of $O_2$ and $CO_2$ in said equilibrating gases, and the composition and other known constants of said first and second solutions.

It will be understood that the method according to the invention renders it possible to perform analyses of a number of different blood samples in a fully automatic manner, and according to the present invention an automatic blood sample analyzer has also been provided, said analyzer comprising conduit means having a blood sample inlet section and a measuring section, said measuring section including means for measuring at least one parameter of a blood sample, means for discharging the blood sample from the measuring section when measurements have been performed by said measuring means, rinsing fluid storage means, means for moving rinsing fluid from said storage means through said measuring and inlet conduit sections, calibrating fluid storage means, means for moving amounts of calibrating fluids from said storage means into said measuring section, means for discharging said amounts of calibrating fluids from the measuring section, and control and computer means for controlling the operational sequence of said moving means and discharge means and for converting the parameters measured by said measuring means to values based on calibration values obtained by measuring the parameters of said calibrating fluids in said measuring section. The measuring means of the analyzer may comprise electrodes for measuring pH, $PO_2$, and/or $PCO_2$, and preferably also a photometric sensing device for measuring the hemoglobin contents of the blood sample.

The present invention also provides an apparatus for measuring indications for blood parameters including pH, $PO_2$, and $PCO_2$, said apparatus comprising electrodes for measuring said indications, computer means for converting the measured indications to easily conceivable units, and calibrating means for use in calibrating measurements performed by said measuring electrodes, and comprising means for equilibrating first and second calibrating liquids with different gas mixtures each containing measured known amounts of calibrating active gases. These active gases preferably comprise $CO_2$ and $O_2$. Furthermore, the apparatus according to the invention may comprise means for measuring the gas pressure above said equilibrated calibrating liquids and including a transducer for converting the measured pressure values into electrical signals to be transmitted to said computer means which is adapted to base conversion of measured indications on measurements performed by said electrodes on said equilibrated calibrating liquids, and on the electrical signals received from said transducer. Such an analyzer may calibrate itself by using only said two calibrating liquids for all of the measuring devices. The apparatus may also comprise photometric means or a photometric sensing device for measuring the hemoglobin contents of the same sample of whole blood which is measured by said measuring electrodes. In that case the said photometric sensing device may also be calibrated by one or both of the same calibrating liquids having known photometric characteristics.

The term "blood" used in the present specification and in the appended claims is intended also to comprise other biological fluids having similar characteristics.

BRIEF DESCRIPTION OF THE DRAWINGS

The invention will now be further described, by way of examples, with reference to the accompanying drawings in which.

DESCRIPTION OF THE PREFERRED EMBODIMENT

Figure 1:
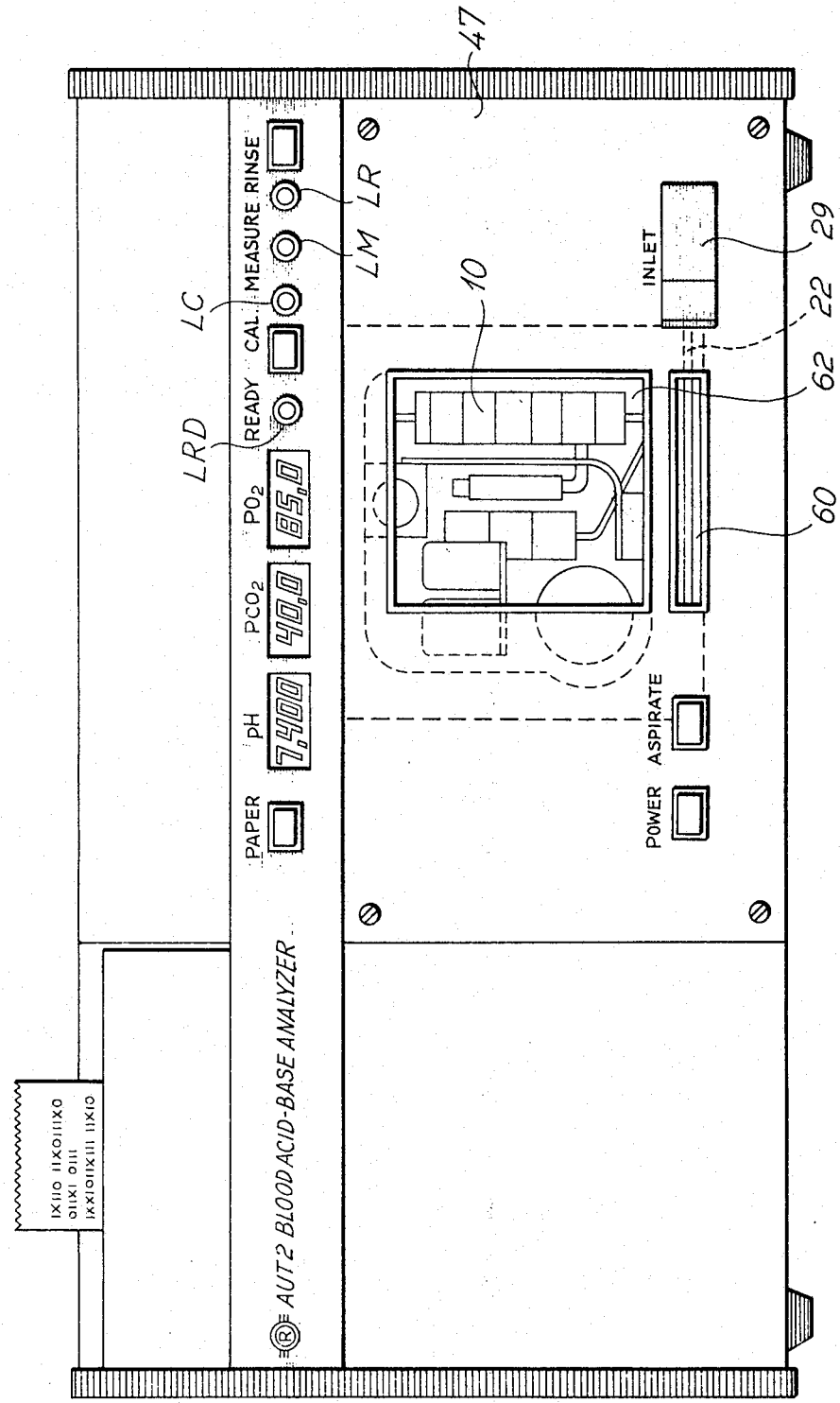
FIG. 1 is a front view of the cabinet of an embodiment of the automatic blood analyzer according to the invention.

1. Overall Description of the Mechanical Structure and Function of the Analyzer.

The presently preferred embodiment of the automatic blood sample analyzer according to the invention is adapted for directly measuring and displaying the measured values of the blood parameters pH, $PCO_2$, $PO_2$, and Hgb%. Thus, the fluid conduit system of the analyzer shown in FIG. 2 includes a measuring section 10 which is preferably arranged in a substantially vertical or upright position. Said measuring section is provided with four measuring chambers, viz, one for each of said blood parameters. A photometric hemoglobin measuring device 11 which will be described more in detail in the following, is arranged at the HgB% measuring chamber, and the other measuring chambers are provided with measuring electrodes 12 – 14 of a type wellknown in the art, or other measuring devices being able to convert the measured parameter values into electrical currents or signals. A calomel electrode or reference electrode 15 for the electrode 14 is connected to a container or source 16 for a solution of KCl and to the measuring section 10 via the pH-electrode by means of a conduit 17. Solution of KCl may be passed from the container 16 through the conduit 17 to the calomel electrode 15 and further to the inlet end portion of the measuring section 10 by means of a pump $P_2$ or another liquid transporting device. The container 16 is furthermore connected to the calomel electrode 15 by means of a shunt conduit 18 provided with a valve $V_R$ which is preferably a solenoid actuated valve. A valve $V_5$, preferably a solenoid actuated diaphragm valve, positioned between the pH-electrode 14 and the junction of the conduit 17 and the measuring section may control communication between the inlet end portion of said measuring section 10 and the remainder portion thereof. Said inlet end portion of the measuring section 10 may be provided with a heat exchanger 19 which may for example have the form of fins or ribs extending from the outer side of the tube or conduit, and at each end of the measuring section 10 a liquid sensor or detector designated by the reference numerals 20 and 21, respectively, are provided for sensing or detecting the presence of liquid in the parts of the conduit system opposite to said sensors.

It should be understood that it is possible to provide the analyzer with measuring devices of other types than those used in the embodiment described. If desired, the analyzer may also be adapted for measuring another number of and/or other types of parameters, and one or more measuring devices may be arranged in a single chamber.

Figure 2:
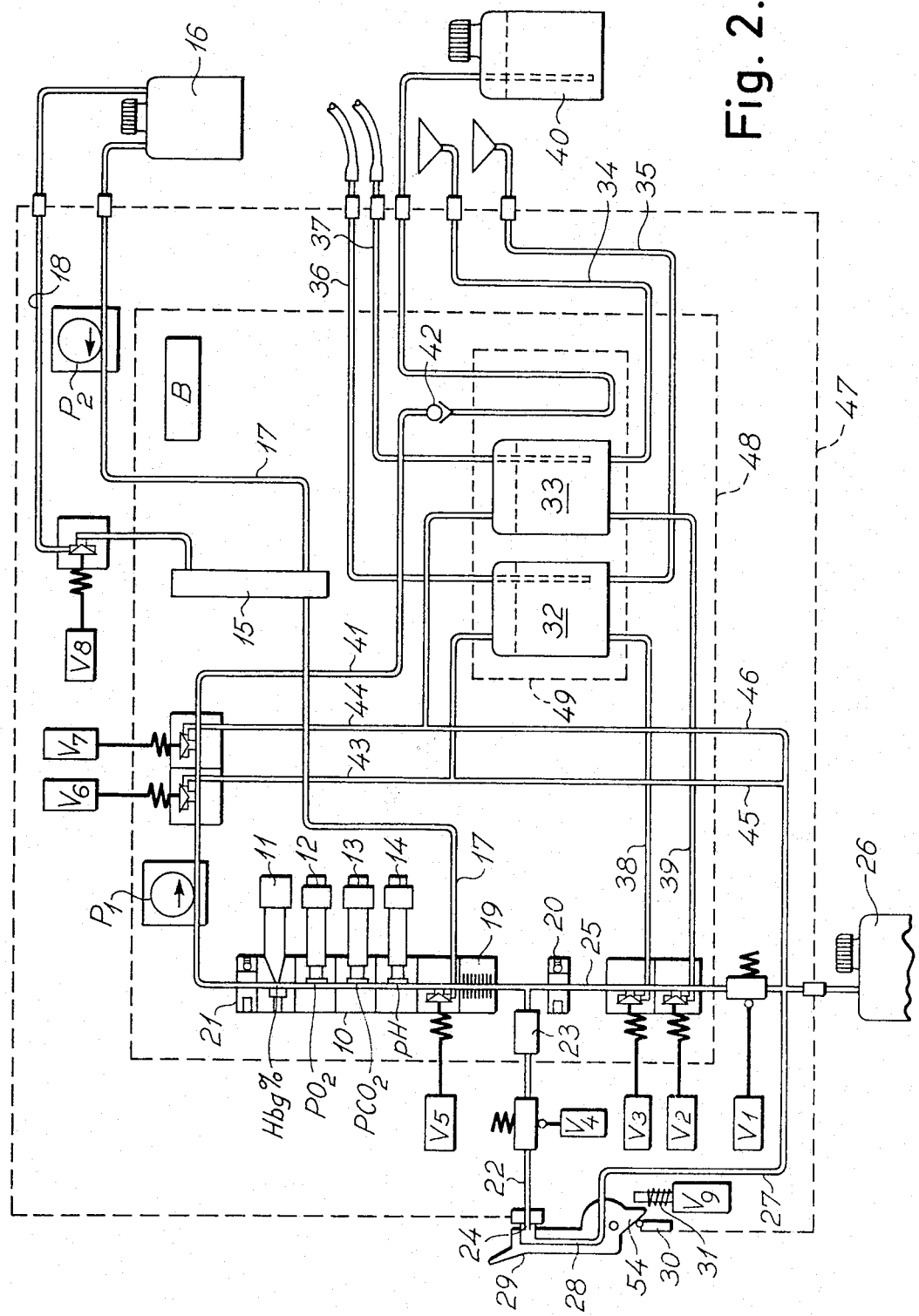
FIG. 2 is a diagram showing the fluid conduit system of the analyzer.

The conduit system of the analyzer embodiment shown in FIG. 2 also comprises an inlet section 22 connected to the measuring section 10 between the heat exchanger 19 and the sensor 20. The inlet section is controlled by a valve $V_4$ and includes an enlargement or transitional storage chamber 23 positioned between the valve $V_4$ and the measuring section 10. The inlet section 22 has a free end 24 extending outwardly from the front panel of the analyzer. The inlet and measuring sections 22 and 10 are preferably of such small size that less than 500 microlitres of blood is necessary for performing measurements in the analyzer. At the liquid sensor 20 the measuring section 10 continues into a drainage conduit section 25 connecting the inlet section with a waste container 26. Fluid flow through the drainage section may be controlled by a valve $V_1$, and the drainage section is connectable to the free end 24 of the inlet conduit section by a shunt conduit section 27 having a flexible end portion 28 forming part of an inlet key 29 movable between a closed position in which the flexible end portion 28 of the shunt section surrounds the projecting free end 24 of the inlet section 22 and thereby establishes communication between said sections, and an open position in which the communication between the inlet and shunt sections is broken. A microswitch 30 may be actuated by the movement of the key 29, which may be locked in its closed position by a locking device 31 controlled by a solenoid $V_9$ as described more in detail later in this specification.

The blood sample analyzer shown in FIG. 2 also comprises storage containers of reservoirs 32 and 33 for two different calibrating fluids of known composition. In principle these fluids may be of any type provided that the pH-, $PCO_2$- and $PO_2$-values thereof are known or may be currently calculated. Preferably, the calibrating fluids are aqueous solutions each equilibrated with a gas mixture of known composition and containing $O_2$ and $CO_2$, at least the relative amounts of $CO_2$ in the mixtures used for equilibrating said calibrating fluids being different. Aqueous solution may be supplied to the containers 32 and 33 through feeding conduits 34 and 35, respectively, and the equilibrating gas mixtures may currently be supplied to the storage containers through gas supply conduits 36 and 37, respectively. Each of the gas supply conduits 36 and 37 may be connected to one or more gas storage containers or reservoirs, not shown. The equilibrating gas mixtures of known composition may for example be obtained by means of a gas mixing apparatus of the type disclosed in applicants' U.S. Pat. No. 3,464,434. The storage containers 32 and 33 are connected to the drainage conduit section 25 by means of liquid conduits 38 and 39, respectively, and the liquid flow through these conduits may be controlled by valves $V_3$ and $V_2$, respectively. A rinsing fluid storage container or reservoir 40 which may for example contain an aqueous solution of NaCl, is connected to the measuring section 10 by means of a rinsing fluid conduit 41 which may contain a one-way valve as indicated at 42. The gas spaces of the storage containers 32 and 33 are connected to the rinsing fluid conduit 41 by means of gas conduits 43 and 44, respectively, and the gas flow through these conduits may be controlled by valves $V_6$ and $V_7$, respectively. The gas spaces of the containers 32 and 33 are also communicating with the drainage conduit section 25 through gas conduits 45 and 46, respectively.

The analyzer furthermore comprises a pump $P_1$ or another fluid transporting device for moving fluids in the conduit system, and a gas pressure measuring device B comprising a barometer. The barometer B is used for measuring the pressure of the equilibrating gas mixtures supplied to the storage containers 32 and 33. These gas pressures are, however, preferably equal to atmospheric pressure, and therefore the barometer B may be adapted to measure the atmospheric pressure within the analyzer. The gas pressure measured is used for calculating the parameters of the equilibrating fluids in the containers 32 and 33 as described more in detail later in this specification. In FIG. 2 the dotted line 47 indicates the outer limits of the analyzer cabinet, and the dotted line 48 indicates an area or space in which the temperature is controlled so as to be maintained at a substantially constant value, preferably at 37°C. As indicated by the dotted line 49 the storage containers 32 and 33 for calibrating fluids is preferably temperature controlled separately and maintained at the same temperature as the remaining part of the temperature controlled space 47.

In principle the blood analyzer disclosed functions as follows:

If the analyzer is ready for use, which means that no calibrating or rinsing operations are being performed, the solenoid $V_9$ is energized and consequently the locking device 31 is in its retracted position, and the inlet key 29 may be opened. When the inlet key is tilted to its opened position the switch 30 is actuated whereby the analyzer is placed in a "ready position". A blood sample to be measured is now introduced into the inlet section 22. Preferably, the blood sample to be measured is present in a syringe, and the blood sample may then be forced into the inlet section 22 by depressing the piston of the syringe when the outlet end of the syringe cylinder has been pressed against the analyzer inlet, the projecting free end 24 of the inlet section 22 being received in the outlet opening of the syringe cylinder. If desired, the blood sample may alternatively be sucked into the inlet section 22 as described later on, or introduced by means of an automatically operating sampler. Preferably, at least the transitional storage chamber 23 is made from a transparent material so that the user may ascertain that the chamber is being completely filled with blood without bubbles of air or gas. When the blood sample introduced into the inlet section has filled the chamber 23 and reached the liquid sensor 20 the amount of blood introduced is sufficient, and a possible excessive amount will flow through the drainage conduit section 25 to the waste container 26. When the sensor 20 has detected that the blood sample has arrived to that position and the inlet key 29 has been closed the pump $P_1$ is operated so that the blood sample is being pumped from the chamber 23 into the measuring section 10 with the various measuring chambers. Due to the substantially vertical or upright arrangement of the measuring section possible air or gas bubbles are less inclined to become trapped within the measuring section. The operation of the pump $P_1$ is stopped, when the liquid sensor 21 detects that the blood column sucked into the measuring section 10 has reached the position of that sensor above all of the measuring chambers. When the blood sample has been pumped into the measuring section 10 the KCl pump $P_2$ starts operating for pumping KCl solution from the container 16 through the conduit 17 to the lower part of the blood column within the measuring section 10. The measuring devices 11 – 13 start measurement of the blood parameters Hgb%, $PO_2$, and $PCO_2$ as soon as blood has been passed into the respective measuring chambers, and the measuring electrode 14 starts measurement of pH when the column of KCl solution pumped into the conduit 17 by the pump $P_2$ has established contact between the blood column in the measuring section 10 and the calomel electrode 15.

When the measuring operation has been terminated the blood sample is discharged from the inlet section into the waste container 26 by means of the pump $P_1$, and thereafter a rinsing liquid, such as a 0.9% NaCl solution, is pumped from the container 40 through the conduit 41, the measuring section 10, the drainage conduit 25, and also through the inlet section 22, around the projecting free end 24, through the inlet key 29 and the shunt section 27 to the waste container 26. In order to obtain an effective cleaning of the conduit system it is preferably flushed alternately with rinsing liquid from the container 40 and gas from the gas space in one of the containers 32 and 33. Preferably, the last step of the rinsing procedure is blowing of gas through the conduits to be rinsed. During the measurement and rinsing procedures the inlet key 29 is preferably locked in its closed position by the locking device 31. However, when the rinsing procedure has been terminated the locking device 31 unlocks the inlet key 29, and the analyzer is ready for a new measurement which may be indicated by lighting the READY-lamp on the front panel of the analyzer, see FIG. 1. The rinsing procedure described above may also be started by depression of a button designated RINSE shown in FIG. 1.

The analyzer according to the invention is self-calibrating. The calibrating procedure may start automatically at regular time intervals, for example of half an hour. The analyzer is, however, preferably programmed so that it does not interrupt a measuring procedure in order to start a scheduled calibrating procedure, but postpones the calibration till the measuring procedure has been terminated. Additionally, the analyzer should preferably automatically perform self-calibration as soon as the analyzer is energized after a preceding interruption of current supply to the analyzer. The front panel of the analyzer may be provided with a lamp and a button which is designated CAL in FIG. 1. The lamp may indicate when calibration is taking place, and the calibrating procedure which is now to be described, may also be started optionally by depressing said button.

The initial steps of the calibration procedure comprise pumping of calibrating liquid from one of the containers 32 and 33 through the measuring section 10 in order to remove possible residues of previously used rinsing fluids, and thereafter a fresh amount of the same calibrating liquid is passed into the measuring section 10, and first calibrating measurements are being made by the measuring devices 11 - 14 similar to the measurements performed on the blood sample. The first calibrating liquid is then discharged from the measuring section into the waste container 26 by means of the pump $P_1$, and the measuring section 10 is thereafter flushed with a second calibrating liquid from the other of the containers 32 and 33, whereafter similar calibration measurements of the second calibrating liquid are being performed. The results of the calibrating measurements are being transmitted to and stored in a calculator or computer which is adapted to evaluate the results received from the measuring devices 11 - 14 when measuring blood samples, on the basis of the latest calibration results as will be described in the following. When the measurements of the second calibrating liquid have been terminated the said liquid is discharged from the apparatus, and the measuring section is flushed with a gas or gas mixture, preferably from the gas space in one of the containers 32 and 33, and the analyser is again ready to receive a blood sample.

Normally, the inlet key is locked in its closed position by the locking device 31 during the calibration procedure. It is proposed, however, that the analyzer is adapted to perform calibration when due therefor even if the inlet key 29 erroneously has been left in its open position. In that case calibrating liquid will be discharged from the apparatus through the free end 24 of the inlet section 22.

2. Overall description of the electronic system.

Figure 3:
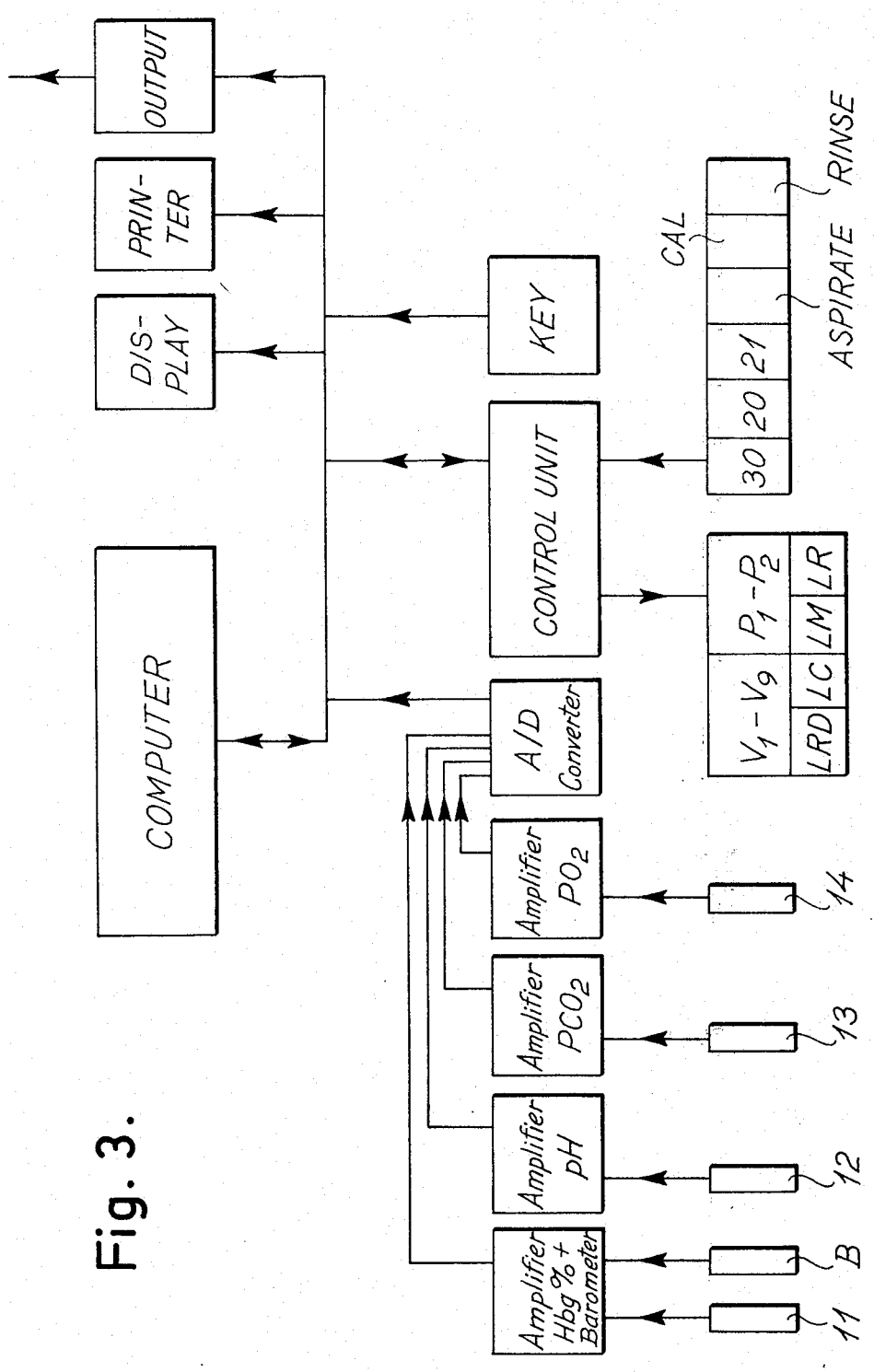
FIG. 3 is a block diagram showing the electronic system of the analyzer.

FIG. 3 diagrammatically illustrates the electronic system of the analyzer described above. The measuring devices 11 - 14 and the barometer B are adapted to convert the measured values into electrical currents or signals which may be transmitted to amplifiers associated therewith. The amplifier outputs are connected to the input of an A/D converter for translating the amplified analog signals from the measuring devices into digital form. The converted digital signals are transmitted to a calculator or computer which is in turn provided with a display device, a printing device, and a computer output. If desired, the computer may alternatively be connected to a teleprinter or the like. In the embodiment shown in FIG. 1 the display comprises values for the parameters pH, $PCO_2$, and $PO_2$, and also a warning device for warning the operator in case the dimensions of the measured values seem to indicate an error. The printer which is preferably arranged within the cabinet of the analyzer, and the teleprinter which may be arranged at a remote place, normally print as well the measured values displayed by the display device as various other values calculated on the basis thereof. The button designated PAPER in FIG. 1 may be depressed in order to obtain accelerated feeding of paper out from the printer. The printing and teleprinting devices may furthermore be controlled by a key board indicated in FIG. 2 by means of which information for identifying the blood sample to be measured may be printed on the same paper ship as that on which the results of the measurements are being printed out.

The electronic system of the analyzer also comprises a control unit. In the preferred embodiment the control unit is of the wellknown electronic type. Alternatively, the control unit may for example be of the mechanical type corresponding to that normally used in automatic washing machines. The control unit controls the operational sequences of the pumps $P_1$ and $P_2$, of the valves $V_1 - V_9$, and of the pilot lamps designated READY, CAL., MEASURE, and RINSE, respectively. In FIG. 2 these lamps are designated LRD, LC, LM, and LR, respectively. The control unit receives signals from the switch 30 which is operated by the inlet key 29 as previously described, from the liquid sensors 20 and 21 arranged at either end of the measuring section 10, and from contacts or switches which may be actuated by the push buttons designated ASPIRATE, CAL., and RINSE.

As easily understood by those skilled in the art at least some of the printers, pilots lamps, push buttons, etc. may be left out and possibly replaced by other types of controlling or indicating devices.

Furthermore the computer may alternatively be of the analog type, and the electronic system may be modified correspondingly.

3. Detailed Description of Preferred Operational Sequences of the Analyzer.

Figure 4:
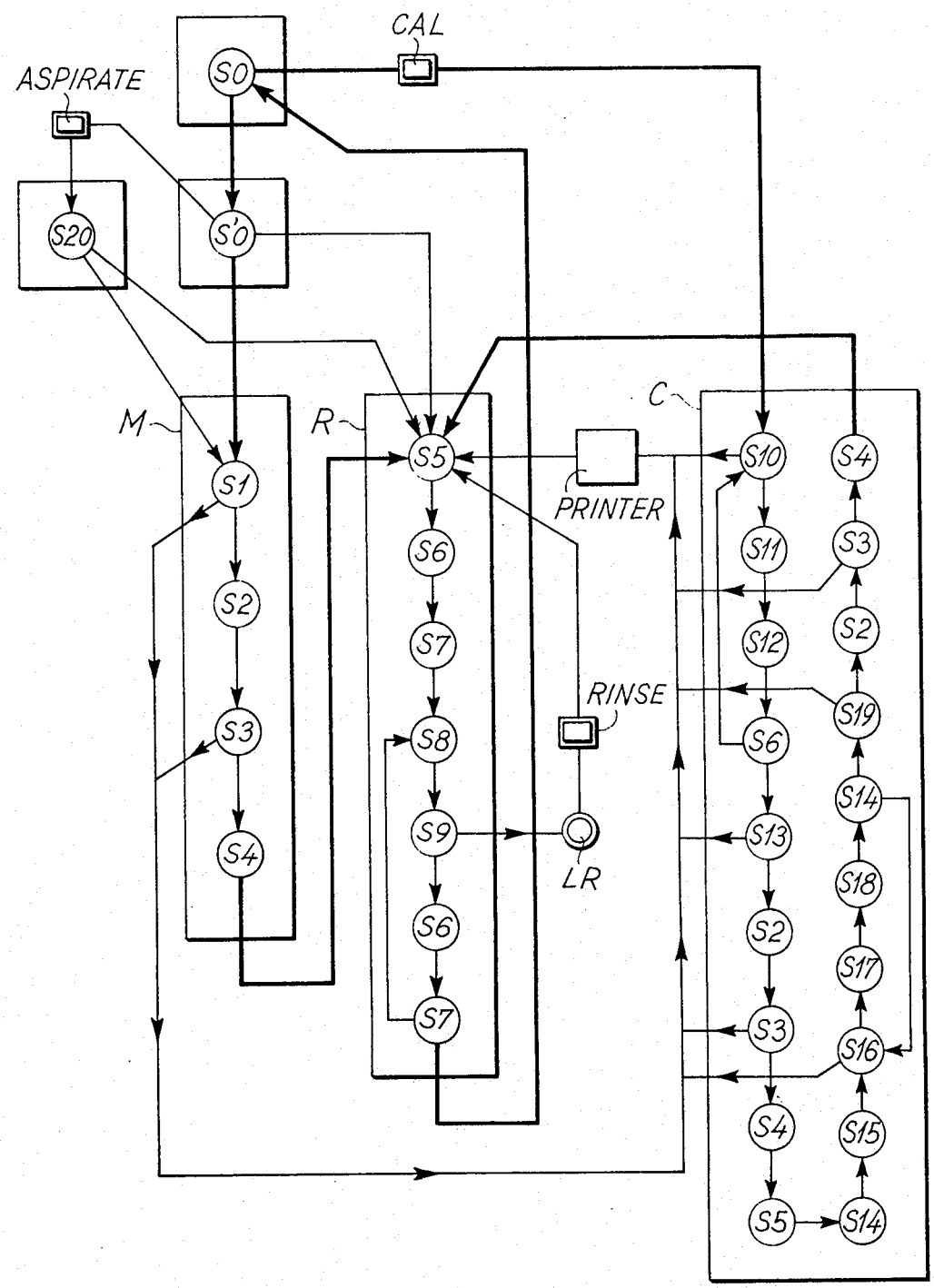
FIG. 4 is a diagram illustrting the preferred possible operational sequences of elements in the analyzer embodiment.

FIG. 4 illustrates diagrammatically the preferred operational sequences for the elements of the analyzer, or the preferred program of the control unit.

The program illustrated comprises three subprograms, viz. for the measuring, rinsing, and calibrating procedures, and in FIG. 4 these subprograms are illustrated by blocks designated M, R, and C, respectively. The analyzer elements being controlled by the control unit are the pumps $P_1$ and $P_2$, the valves $V_1 - V_8$, and the solenoid $V_9$. In the preferred embodiment the valves $V_1$ and $V_4$ are hose clamping valves of the type closing the hose or conduit when energized or actuated, the valves $V_2$, $V_3$, and $V_5$, $V_8$ are diaphragm valves of the type opening the associated conduit or tube when energized, and $V_9$ is a solenoid adapted to unlock the locking device 31 when energized. The program illustrated in FIG. 4 comprises 21 different situations or stages referred to as S0 - S20. In each of these stages each of the devices $V_1 - V_9$ may be in an energized (the valves $V_1$ and $V_4$ being closed, the other valves being opened, and the solenoid $V_9$ being in its unlocking position) or a non-energized (the valves $V_1$ and $V_4$ being opened, the other valves being closed, and the solenoid $V_9$ being in its locking position) condition, and each of the pumps $P_1$ and $P_2$ may be in any of four different conditions.

In the following diagram which states the condition of the valves or solenoids $v_1 - V_9$ and of the pumps $P_1$ and $P_2$ in each of the various stages S0 - S20 of the control unit program the four possible pump conditions are designated 00, 01, 10 and 11, respectively. The meaning of these digits is as follows:

00: The pump is stopped
01: The pump is pumping with full speed (for example 4 mls/min. in a forward direction indicated by an arrow in FIG. 2)
10: The pump is pumping with full speed in the opposite direction.
11: The pump is pumping in a forward direction with reduced speed (for example 1.7 mls/min.)

The energized condition of the devices $V_1 - V_9$ is indicated by 1, and the deenergized condition of said devices is indicated by 0.

| Stage | Valves or Solenoides | | | | | | | | | Pumps | |
|---|---|---|---|---|---|---|---|---|---|---|---|
| | $V_1$ | $V_2$ | $V_3$ | $V_4$ | $V_5$ | $V_6$ | $V_7$ | $V_8$ | $V_9$ | $P_1$ | $P_2$ |
| S0  | 0 | 0 | 0 | 0 | 0 | 0 | 0 | 0 | 1 | 00 | 00 |
| S1  | 1 | 0 | 0 | 0 | 0 | 1 | 0 | 0 | 0 | 11 | 00 |
| S2  | 0 | 0 | 0 | 1 | 0 | 0 | 0 | 0 | 0 | 00 | 11 |
| S3  | 0 | 0 | 0 | 1 | 1 | 0 | 0 | 0 | 0 | 00 | 11 |
| S4  | 0 | 0 | 0 | 1 | 1 | 0 | 0 | 0 | 0 | 00 | 00 |
| S5  | 0 | 0 | 0 | 1 | 0 | 0 | 0 | 0 | 0 | 00 | 00 |
| S6  | 0 | 0 | 0 | 1 | 0 | 1 | 0 | 0 | 0 | 10 | 00 |
| S7  | 1 | 0 | 0 | 0 | 1 | 0 | 1 | 0 | 0 | 10 | 11 |
| S8  | 0 | 0 | 0 | 1 | 0 | 0 | 0 | 0 | 0 | 10 | 00 |
| S9  | 1 | 0 | 0 | 0 | 0 | 0 | 0 | 0 | 0 | 10 | 00 |
| S10 | 1 | 1 | 0 | 1 | 0 | 1 | 0 | 0 | 0 | 01 | 00 |
| S11 | 1 | 1 | 0 | 1 | 0 | 1 | 0 | 0 | 0 | 00 | 00 |
| S12 | 1 | 0 | 0 | 1 | 0 | 1 | 0 | 0 | 0 | 00 | 00 |
| S13 | 1 | 1 | 0 | 1 | 0 | 1 | 0 | 0 | 0 | 11 | 00 |
| S14 | 0 | 0 | 0 | 1 | 0 | 0 | 1 | 0 | 0 | 10 | 00 |
| S15 | 1 | 0 | 0 | 0 | 0 | 1 | 0 | 0 | 0 | 10 | 00 |
| S16 | 1 | 0 | 1 | 1 | 0 | 0 | 1 | 0 | 0 | 01 | 00 |
| S17 | 1 | 0 | 1 | 1 | 0 | 0 | 1 | 0 | 0 | 00 | 00 |
| S18 | 1 | 0 | 0 | 1 | 0 | 0 | 1 | 0 | 0 | 00 | 00 |
| S19 | 1 | 0 | 1 | 1 | 0 | 1 | 0 | 0 | 0 | 11 | 00 |
| S20 | 1 | 0 | 0 | 0 | 0 | 1 | 0 | 0 | 1 | 11 | 00 | a. Measuring Procedure.

The analyzer is in a "ready for measurement position". The solenoid $V_9$ is energized so that the inlet key 29 may be opened (Stage S0). In FIG. 4 the opened position of the inlet key is indicated by the stage S'0. At that stage a blood sample may be forced into the inlet section 22 by means of a syringe as previously described, or a hose or tube may be connected to the free end 24 of the inlet section and dipped into a blood sample. In the latter case a button designated ASPIRATE (FIG. 1 and 4) must be depressed, whereby blood is aspirated into the inlet section by the pump $P_1$ (stage S20). Provided that the control unit receives a signal from the liquid sensor 20 within a predetermined time, for example 1 minute, indicating that the inlet section 22 with the transitional storage chamber 23 has been properly filled with blood, the measuring procedure may start. If no signal is received within the said predetermined time no measurement will be performed, but the rinsing procedure will be initiated as indicated in FIG. 4.

In case the blood sample is forced into the inlet section 22 by means of a syringe the measuring procedure will be initiated only if the control unit receives a signal as well from the liquid sensor 20 as from the switch 30 within said predetermined time of for example 1 minute. The signal from the switch 30 indicates that the inlet key 29 has been closed. In absence of one or both of these last mentioned signals no measurement will be performed, but the rinsing procedure will be started. If the measurement procedure proceeds the pump $P_1$ will start pumping blood sample from the inlet section 22 into the measuring section 10 at reduced speed (stage S1). In case the control unit does not receive a signal from the fluid sensor 21 within a predetermined time indicating that the measuring setion 10 with the measuring chambers has been properly filled with blood the measuring procedure will be interrupted and the rinsing procedure will be started, and the printer may indicate the OUT OF RANGE condition. If, however, the measuring section has been properly filled with blood the measuring procedure will proceed. The measuring devices 11 - 13 start measurements immediately when the respective measuring chambers have been filled with blood. It is especially important that the value of hemoglobin contents is made as soon as possible in order to avoid detrimental effects due to blood sedimentation in the column of blood in the measuring section. At stage S2 the pump $P_2$ is being started and KCl solution is thereby being pumped from the container 16 through the conduit 17, and after a predetermined time, for example 0.2 second, the valve $V_5$ is being energized and opened so as to establish communication between the pH-electrode 14 and the calomel electrode 15 through a column of KCl solution in the conduit 17 (stage S3). If the analyzer is working properly the liquid sensor 20 will detect the presence of liquid in the adjacent conduit part and transmit a signal to the control unit. If no such signal is received within a predetermined time the measuring procedure is interrupted and the rinsing procedure is being started, and the OUT OF RANGE condition being indicated by the printer. If the control unit receives a signal from the liquid sensor the measuring procedure may continue. After a predetermined time, for example 6 seconds, the operation of the pump $P_2$ is stopped (stage 4). The blood sample remains in the measuring section for a predetermined time of for example about 90 seconds, and during that period of time the measurements made by the measuring devices 11 – 14 are being terminated, and the resulting measuring signals from these devices are being amplified and transmitted to the computer.

b. Rinsing Procedure.

If the measuring procedure described above has been terminated or interrupted at any of the stages S′0, S20, S1, or S3 for the reasons explained above, the rinsing procedure starts. As a first step, the connection between the KCl conduit 17 and the measuring section 10 will be closed by closing the valve $V_5$ (stage S5). After a predetermined time, for example 3 seconds, the valve $V_6$ is opened, and the pump $P_1$ is operated so as to pump rinsing gas from the gas space of the container 32 through the measuring section 10 in a backward direction and at full speed. Thereby the blood sample is forced out of the measuring section, through the drainage section 25 and the opened valve $V_1$ into the waste container 26 (stage S6). When a predetermined time has lapsed, for example 3 seconds, the valve $V_1$ is being closed whereas the valves $V_4$ and $V_8$ are being opened, and the valve $V_6$ remains open. The pump $P_1$ continues its operation with full speed in backward direction, and operation of the pump $P_2$ in a forward direction with a reduced speed is started (stage S7). The operation of the pump $P_2$ generates a circulating movement of KCl solution through the conduit 17, the calomel electrode 15, and the shunt conduit 18, whereas the operation of the pump $P_1$ generates a flow of gas from the gas space of the container 32, through the measuring section 10, the inlet section 22, and the shunt section 27, whereby remaining parts of the blood sample are also flushed out from these conduit sections. After a predetermined time, for example 3 seconds, the valve $V_1$ is being opened whereas the valves $V_4$, $V_6$, and $V_8$ are being closed. The pump $P_2$ is being stopped, whereas the pump $P_1$ continues to operate. Thereby rinsing solution, for example NaCl solution, from the storage container 40 is being pumped through the measuring section 10 and the drainage section 25 to the waste container 26 (stage S8). When the predetermined time (for example 3 seconds) has lapsed the valve $V_1$ is being closed, whereas the valve $V_4$ is being opened, and the pump $F_1$ continues to operate. Rinsing solution is now being pumped through the measuring section 10, the inlet section 22, and the shunt section 27 to the drainage container 26 (stage S9). It should be noted that the rinsing solution comes into contact with as well the inner as the outer surfaces of the projecting free end 24 of the inlet section 22, whereby the effective rinsing of that element may be obtained.

If the container 40 for rinsing solution is empty no effective rinsing will take place at stages S8 and S9. In order to secure that an effective rinsing with rinsing solution has in fact been performed the rinsing procedure will not proceed from S12 unless the control unit receives a signal from the liquid sensor 21 indicating that rinsing solution is present in the adjacent part of the conduit. If that signal is not received within a predetermined time the operator's attention may be called to the situation by the flashing pilot lamp LR. The rinsing procedure may at any time be started by depressing the RINSE button indicated in FIG. 4. Provided that the control unit receives a satisfactory signal from the sensor 21 within the time stipulated the rinsing procedure will proceed, and as indicated in FIG. 4 this will involve repeating the stages S6 and S7, and thereafter repeating the succession of the stages S8, S9, S6, and S7 a number of times, for examples three times. It will be understood that thereby the measuring section 10, the inlet section 22, the shunt section 27, and the drainage section 25 will alternately be flushed with gas and liquid a number of times. The rinsing procedure is now completed, and the apparatus returns to its "ready position" corresponding to stage S0.

c. Calibrating Procedure.

The control unit is adapted to start a calibrating procedure with regular time intervals, for example every half an hour, and also when the operator depresses a push button designated CAL. If, however, a measuring procedure or rinsing procedure is taking place the calibrating procedure will not be started before the rinsing procedure has been terminated and the analyzer has returned to its "ready position".

The calibrating procedure starts at stage S10 at which the valves $V_2$ and $V_6$ only are opened, and the pump $P_1$ is operating with full speed and pumps calibrating liquid from the container 33 in a forward direction, i.e. through the liquid conduit 39, the drainage section 25 up into the measuring section 10. The control unit does not proceed to the next stage before it has received a signal from the liquid sensor 21 indicating that the measuring section 10 has been completely filled with calibrating liquid. If no signal is received within a predetermined time, for example within one minute, the calibrating procedure will be interrupted and the rinsing procedure will be initiated. The situation may be made clear to the operator for example thereby that the printer prints OUT OF RANGE.

If the calibrating procedure proceeds the pump $P_1$ will stop (stage S11), and after a predetermined time, for example 0.2 second, the valve $V_2$ will be closed (stage S12). After the further predetermined time delay, for example 0.2 second, the calibrating liquid will be driven from the measuring section 10 into the waste container 26 by means of gas pumped from the container 32 by means of the pump $P_1$ (stage S6) as previously described. After a further small time delay the succession of stages S10, S11, S12, and S6 is repeated a number of times, for example three times, in order to remove possible residues of liquids which might influence the calibration measurement. When the measuring section has been effectively flushed with the first calibrating liquid as described above another amount of the same calibrating liquid is being pumped into the measuring section from the container 32 by the pump $P_1$ operating with slow speed. The valves $V_2$ and $V_6$ are opened, and the liquid is pumped through the conduit 38, the drainage section 25 into the measuring section 10 (stage 13). The control unit will not proceed to the next stage before a signal has been received from the sensor 21 indicating that the measuring section has been filled with the calibrating liquid so that a proper measurement may be performed by the measuring devices 11 – 14. If no signal has been received within a predetermined time, for example within 1 minute, the calibrating procedure will be interrupted and the rinsing procedure will be initiated. If, however, a proper sensor signal is being received within the predetermined time limit the calibrating procedure will proceed with the succession of stages S2, S3, S4, and S5 previously described in connection with the measuring procedure. Thus, the measuring devices 11 – 14 will perform calibrating measurments of the first calibrating liquid from the container 32, and the resulting electrical measuring signals will be amplified by the amplifiers, converted to digital form by the A/D converter and transmitted to the computer where the digital values are stored. The same is true for signals received substantially simultaneously from the barometer B measuring the air pressure which corresponds to the gas pressure in the air spaces of the containers 32 and 33.

After a small predetermined time delay the calibrating liquid is being flushed out of the measuring section 10 and discharged into the waste container 26 by gas from the gas space of the container 33. The valves $V_1$ and $V_7$ are opened, and the gas is being pumped through the conduit 44 to the measuring section 10 by the pump $P_1$ which is operating with full speed in a backward direction (stage 14). After a predetermined time, for example 3 seconds, the valve is being closed and the valve $V_4$ is opened. The valve $V_7$ is still open and the pump $P_1$ is operating with full speed in a backward direction (stage 15), whereby gas from the gas space in the container 33 is being passed through the conduit 44, the measuring section 10, the inlet section 22, and the shunt section to the waste container 26. Thereby possible liquids in the conduit sections 22 and 27 will also be removed. When the predetermined time, for example 3 seconds, has lapsed the program proceeds to the next stage (S16) at which only the valves $V_3$ and $V_7$ are open, and the pump $P_1$ is operating with full speed in a forward direction. Thereby calibrating liquid from the container 32 is being pumped through the conduit 38 and the drainage 25 into the measuring section 10. When the liquid sensor 21 detects liquid in the adjacent conduit part it transmits a signal to the control unit. If no signal is received within a predetermined time, for example one minute, the calibrating procedure will be interrupted and the rinsing procedure will be initiated as previously explained. If the calibrating procedure proceeds the pump $P_1$ is stopped (S17), and after a certain time (for example 0.2 second) the valve $V_2$ is being closed (S18). After a small time delay the calibrating liquid is being forced out from the conduit sections 10 and 25 by repeating the previously described stage S14. The succession of stages S16, S17, S18, and S14 just described is in fact a flushing or rinsing of the measuring section 10 and other conduit sections with the second calibrating liquid. As indicated in FIG. 4 the said succession of stages or flushing operation is preferably repeated, for example 3 times. The samples of the second calibrating liquid from the container 32 on which the calibration measurements are to be performed may now be passed into the measuring section 10. Therefore, when a certain predetermined time (for example three seconds) has passed after the termination of the last flushing cycle the valve $V_1$ is being closed, the valve $V_3$ is opened, and the valve $V_7$ remains open. The pump $P_1$ is operated so as to pump with reduced speed in forward direction whereby calibrating liquid from the container 32 will be pumped into the measuring section 10. It is, of course, essentially that all of the measuring chambers in the measuring section 10 are being completely filled with calibrating liquid, and therefore the calibrating procedure will proceed only if the control units receive a signal from the liquid sensor 21 indicating that calibrating liquid has reached the upper part of the measuring section 10. If no signal is received within a predetermined time, for example within one minute, the calibrating procedure will be terminated and the rinsing procedure initiated as previously explained.

If the calibrating procedure proceeds the measuring devices 11 – 14 will perform measurements on the second calibrating liquid in the measuring chambers, and in order to enable the pH-electrode 14 to perform measurement the previously described succession of stages S2, S3, and S4 is being repeated whereby the calomel electrode 15 is being connected to the calibrating liquid in the measuring section 10 through a column of KCl solution in the conduit 17. The set of values measured by the measuring devices 11 – 14 and by the barometer B is transmitted to and stored in the computer as explained above in connection with the first calibrating liquid. The parameters such as pH, $PCO_2$, $PO_2$ and the transparency of the calibrating liquids are known or may be calculated when the air pressure measured by the barometer is known, and the computer is adapted to evaluate the signals received from the measuring devices 11 – 14 during a measuring procedure on the basis of the last received and stored sets of calibrating values. In this manner the computer may consider possible current changes of the measuring devices.

A calibrating procedure is always followed by a rinsing procedure, and when the rinsing procedure has been terminated the analyzer is ready for receiving a new blood sample to be measured.

In case irregularities occur during the calibrating procedure the pilot lamp designated CAL starts flashing in order to call the operator's attention thereto.

4. Examples of Formulae on which Computer Calculation may be Based.

The calibrating fluids used in the preferred embodiment of the analyzer according to the invention are liquid hydrogencarbonate solutions equilibrated with gas mixtures containing known amounts or percentages of $CO_2$ and $O_2$. In the gas mixture used for equilibrating the two calibrating liquids at least the relative amounts of $CO_2$ and preferably also the relative amounts of $O_2$ are different.

The partial pressure of carbon dioxide in each of the equilibrated calibrating liquids contained in the containers 32 and 33 may now be calculated by using the following formula $$PCO_2 = (b - p)/100 \ CO_2\% \ \text{mm Hg},$$

wherein $b$ is the pressure of the equilibrating gas mixture in mm Hg, $p$ is the pressure in mm Hg of saturated water vapour at the actual temperature, and $CO_2\%$ is the percentage of $CO_2$ in the equilibrating gas mixture. In the preferred embodiment of the analyzer according to the invention the temperature of the calibrating liquids is maintained at 37°C. At that temperature the pressure of saturated water vapour is about 47 mm, therefore $$PCO_2 = b - 47/100 \ CO_2\% \ \text{mm Hg}.$$

The partial pressure of oxygen in the equilibrated calibrating liquids may be calculated from a corresponding equation, viz.

$$PO_2 = b - 47/100 \; O_2\% \text{ mm Hg}.$$

Presently, it is intended to use an equilibrating gas mixture containing about 5.6% $CO_2$, and about 19.8% $O_2$ for one of the calibrating fluids, and a gas mixture containing about 11.2% $CO_2$ and about 18.5% $O_2$ for the other calibrating fluid.

The pH-values of the calibrating fluids may be derived from the following equation $$pH = K + \log HCO_3^-/(\alpha \times PCO_2)$$

wherein $K$ is a constant depending on the characteristics of the liquid being equilibrated, and $\alpha$ is the solubility coefficient of $CO_2$ in the calibrating liquid.

It will be understood that the parameters $PCO_2$, $PO_2$, and pH for the calibrating fluids vary with the pressure of the equilibrating gas mixtures which is preferably equal to the atmospheric pressure. On the basis of the measurement signals received from the barometers B during the calibrating procedures and on the basis of the above equations the computer may calculate the up-to-date correlated parameters $P_1CO_2$, $P_1O_2$, $p_1H$ and $P_2CO_2$, $P_2O_2$, $p_2H$, respectively, for the two calibrating fluids.

The unknown correlated values of parameters $P_xCO_2$, $P_xO_2$, $p_xH$ of a blood sample being measured in the measuring section 10 of the analyzer may now be calculated from the following equations:

$$P_xCO_2 = 10 \; [(V_x - V_1)/(V_2 - V_1) \times \log P_2CO_2/P_1CO_2 + \log P_1CO_2 \;],$$

wherein $V_x$ is the voltage or potential measured in the blood sample by the $PCO_2$-electrode 13, and $V_1$ and $V_2$ are the corresponding voltages or potentials measured by the electrode during the last calibration procedure, $$P_xO_2 = A_x/A_1 \times P_1O_2,$$

wherein $A_x$ is the current measured by the $PO_2$ electrode 12 in the blood sample, and $A_1$ is the corresponding electrode current measured during the last calibrating procedure, $$P_xH = [(V_x - V_1)/(V_2 - V_1)](p_2H - p_1H) + p_1H,$$

wherein $V_x$ is the voltage or potential measured in the blood sample by the pH-electrode 14, and $V_1$ and $V_2$ are the corresponding voltages or potentials measured by the pH-electrode during the last calibration.

As previously mentioned the hemoglobin contents of the blood sample is directly measured by a photometric device 11 which will be described more in detail below. When the parameters $PCO_2$, $PO_2$, pH and Hgb% of the blood sample are known it is possible to calculate a number of other blood parameters, vide applicants' U.S. Pat. No. 3,654,445. The computer of the analyzer according to the invention may, of course, be adapted to calculate an optional number of such further parameters including buffer base, base excess, standard bicarbonate, actual bicarbonate, total $CO_2$, total $O_2$ etc. Any of these parameters may be calculated by the computer in the analyzer according to the invention on the basis of formulae generally known by those skilled in the art and/or formulae which may be derived from the Siggard Andersen nomogram mentioned in applicants' said U.S. Patent.

5. Blood Sample Inlet.

Figure 5:
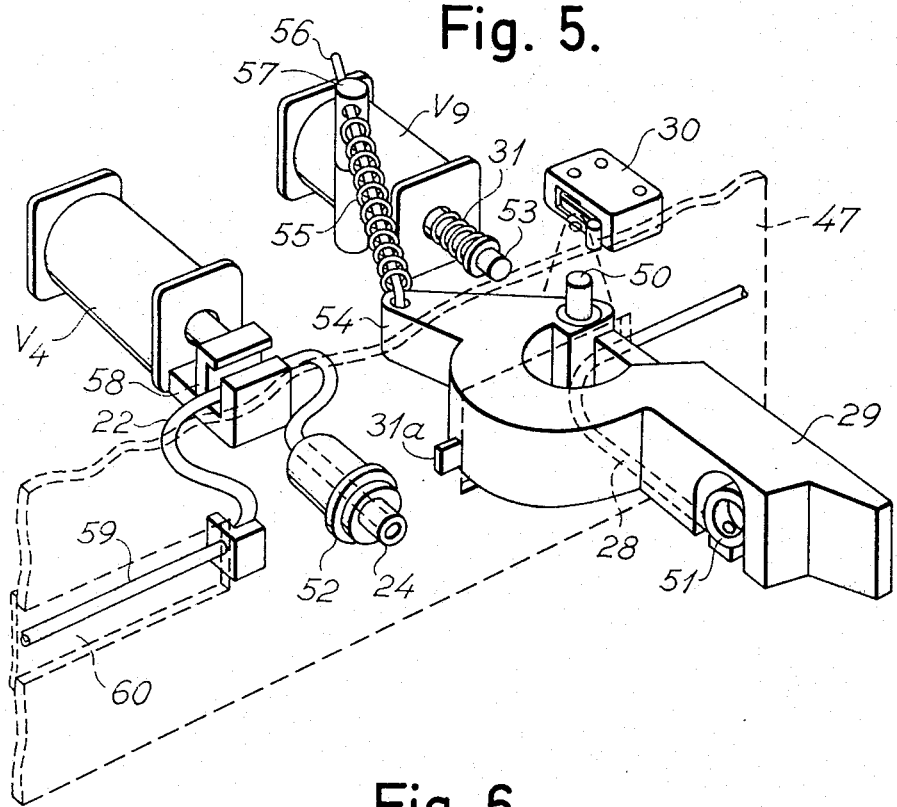
FIG. 5 is an enlarged perspective view of the blood sample inlet and the adjacent analyzer elements.

FIG. 5 shows the blood sample inlet and the adjacent analyzer elements in enlarged scale. The inlet key 29 which is shown in its open position is swingable about a vertical pin or shaft 50. The inlet key comprises a cap or hood 51 communicating with the flexible conduit portion 28. The inner diameter of the cap 51 substantially exceeds the outer diameter of the extending free conduit end 24, and in the closed position of the inlet key 29 the inner walls of the cap 51 surround the conduit end 24 in spaced relation and the end surface of the cap tightly engages a gasket or sealing ring surrounding the projecting conduit end 24. By this arrangement as well the inner as the outer surfaces of the projecting end of the conduit inlet section 22 will be cleaned during the rinsing procedure described above. The locking device 31 operated by a solenoid $V_9$ comprises a rod 53 and a radially extending tab or nose 31a on the key 29. A further, rearwardly extending nose 54 is cooperating with the compression spring 55 mounted on a rod 56 which is connected to the nose 54 at one end and extends displaceable through a hole in a post 57 at its other end. The bias of the spring 55 influences the key 29 in such a manner it has two stable positions only, viz. the open and the closed position. In the closed position of the key the nose 54 takes up a position indicated by dotted lines in which the switch 30 is actuated by the nose. In that closed position the solenoid $V_9$ may be deenergized whereby the rod 53 will be moved to an extended position in which it engages the nose or tab 31a and thereby prevents movement of the key from the closed position.

The valve $V_4$ is a solenoid operated clamp 58 engaging a compressible part of the inlet conduit section 22. A solenoid operated clamp of this type will be described more in detail in connection with FIG. 10.

The inlet conduit section 22 comprises a transparent section 59 visible through a window 60 in the front panel of the analyzer. Thereby it is made possible for the operator of the analyzer to check that the column of blood being introduced in the inlet section 22 is continuous and non-interrupted by air bubbles of substantial size.

5. Detailed Description of Temperature Controlled Space or Box.

Figure 6:
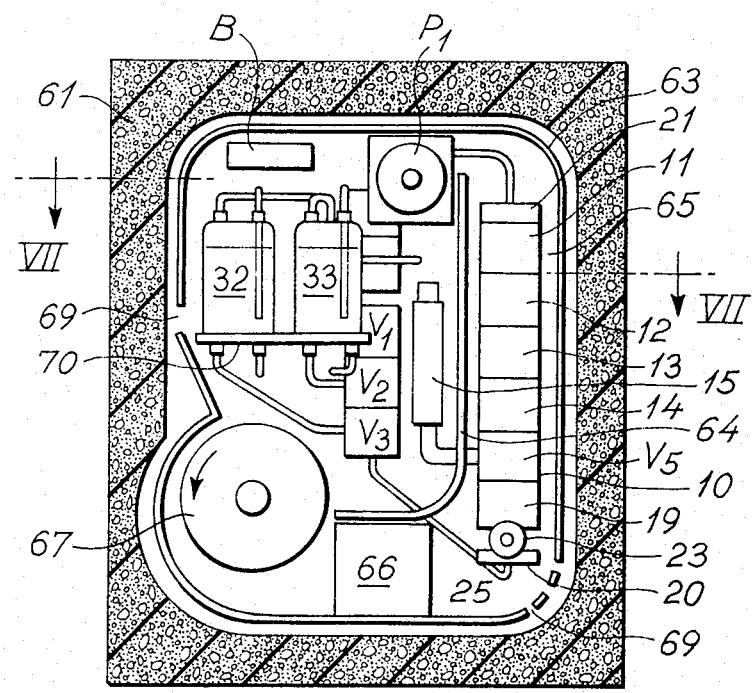
FIG. 6 is a sectional view of a temperature controlled box within the analyzer.
Figure 7:
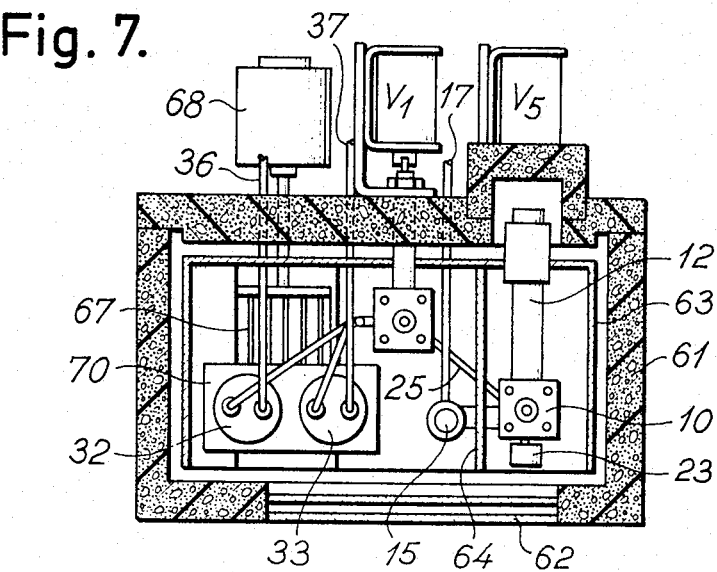
FIG. 7 is a sectional view of the temperature controlled box as indicated by the arrows VII — VII in FIG. 6.

FIGS. 6 and 7 illustrate details of the temperature controlled space indicated by the dotted line 47 in FIG. 2. The temperature controlled space is surrounded by a heatinsulating container or box 61 which may for example be made of foamed polyurethane and provided with double panes 60 and 62 opposite to the inlet conduit section 22 and the measuring secton 10, vide FIG. 1. An inner wall or container 63 which is preferably made of transparent polyvinyl chloride, is arranged inside the container 61 and in spaced relation to the inner wall surface thereof. The container or box 61 also contains a guide plate or wall 64. The inner wall 63 and the guide plate 64 define a channel or passageway 65 in which a heating device or element 66 and the measuring conduit section 10 are arranged, vide FIG. 6. A fan or blower 67 driven by a motor 68 arranged outside the container 61 is adapted to circulate air through the passageway 65. The inner container 63 is provided with openings 69 so that air is also circulated through the space defined between the inner wall surface of the outer insulating container 61 and the outer wall surface of the inner container 63. The heat generation of the heating device 66 is controlled by a temperature controlling device (not shown) securing a substantially constant temperature, preferably at 37°C, within the container 61. In order to secure that a blood sample introduced into the inlet conduit section 22 of the analyzer attains the temperature desired (preferably 37°C) before being passed into the measuring chambers of the inlet section 10, the heat exchanger 19 is arranged in the passageway 65 not far from the heating device 66.

The equilibrating gas mixtures fed into the calibrating containers 32 and 33 are not saturated with water vapour. Therefore, a certain evaporation will take place, and the consumption of heat or evaporation will tend to cause a dropping temperature in the containers 32 and 33. In order to counteract that tendency the containers 32 and 33 are preferably separately temperature controlled as indicated by the dotted line 49 in FIG. 2. As shown in FIGS. 6 and 7 the containers 32 and 33 may be arranged on a supporting plate 70 which may be heated by a power transistor, not shown, the output voltage of the transistor being controlled by a thermophial arranged on the plate 70.

7. Detailed Description of the Solenoid Actuated Diaphragm Valves.

Figure 8:
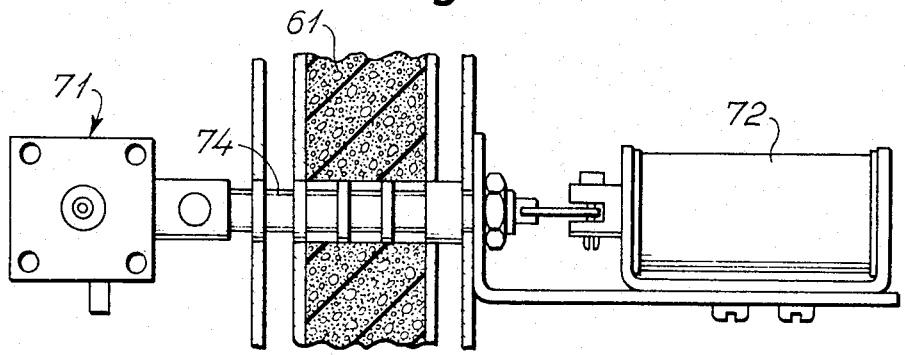
FIG. 8 is one of the solenoid actuated diaphragm valves in the analyzer shown in enlarged scale.
Figure 9:
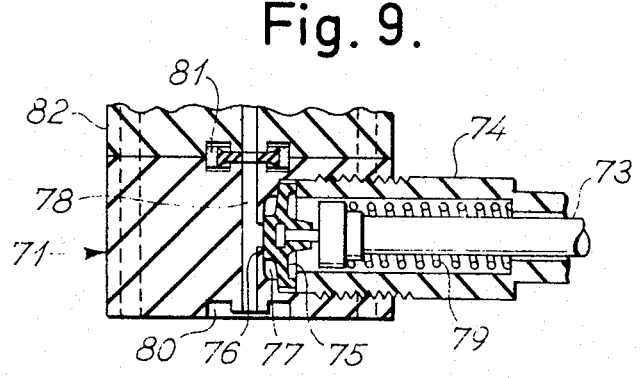
FIG. 9 is a fragmental sectional view of the diaphram valve shown in a further enlarged scale.

The valves $V_2$, $V_3$, $V_5$, $V_8$, see FIG. 2, are preferably of the type shown in FIGS. 8 and 9. These valves comprise a valve mechanism 71, see FIG. 9, arranged in the inner space of the heat insulating container 61 and a solenoid or electromagnet 72 for operating the valve mechanism 71. The solenoid 72 and the valve mechanism 71 are interconnected by a control rod or actuating rod arranged within a tube 74 passing through the wall of the heat insulating container 61. The rod 73 and the tube 74 are preferably made from a heat insulating material in order to prevent that heat generated by the solenoid 72 is transferred to the inner of the container 61. The inner end of the rod 73 is connected to a valve diaphragm 75 preferably made from neoprene rubber and cooperating with a valve seat 76 formed in a valve casing 77 containing a bore 78 which forms part of the conduit system in the analyzer. The rim or periphery of the diaphragm 75 is held between an annular shoulder in the valve casing 77 and the inner end of the tube 74 screwed into an internally threaded bore 78 in the valve casing. A coil spring 79 positioned between a shoulder within the tube 74 and a shoulder on the rod 73 is biasing the diaphragm 75 against its closed position so that the valve will automatically close when the solenoid 72 is deenergized. The valve casing 77 is provided with annular recesses 80 surrounding the bore 78 and being adapted to adopt sealing rings or gaskets 81 for obtaining fluid tight connections between the valve casing and adjoining analyzer elements 82.

8. Detailed Description of Hose or Conduit Clamping Valve.

Figure 10:
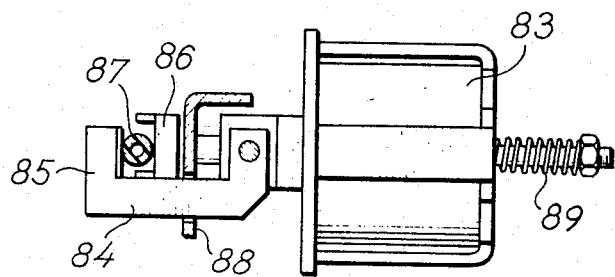
FIG. 10 is a hose or conduit clamping valve in the analyzer.

The valves $V_1$ and $V_4$, see FIG. 2, are preferably of the type shown in FIG. 10. These valves comprise a solenoid or electromagnet 83 and a clamping or compressing device 84. The device 84 has a stationary or fixed jaw 85 and a jaw 86 movable or displaceable in relation thereto. The device cooperates with a resiliently compressible conduit secton 87 — preferably a hose of silicone rubber — arranged between the jaws 85 and 86. The solenoid 83 comprises a valve operating or actuating rod 87 having a jaw engaging member at one end and being influenced by the bias of a spring member 89 at its other end. The spring bias and the resiliency of the hose 87 tend to move the jaw engaging member towards the right in FIG. 10 and thus to open the conduit section 87. When the solenoid 83 is being energized the actuating rod 87 and the member 88 and then also the displaceable jaw 86 will be moved to be left whereby the hose 87 will be compressed and closed. Thus, a valve of the type shown in FIG. 10 is closed when the associated solenoid is energized, and opened when the solenoid is deenergized. The valve described has the advantage that it may be used in association with a normal compressible conduit or hose and does not involve use of complex inner conduit surfaces which may be difficult to rinse during the previously described rinsing procedure of the analyzer.

9. Detailed Description of A Measuring Chamber.

Figure 11:
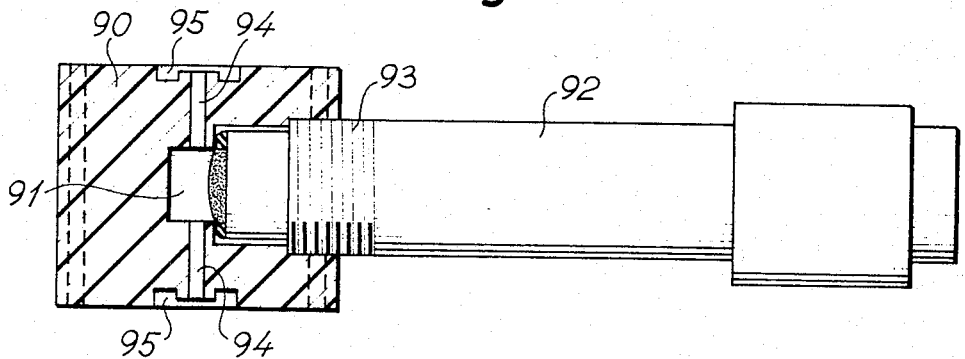
FIG. 11 is a measuring chamber shown in partially sectional view.

The measuring chambers associated with the measuring electrodes 12, 13, and 14 and forming part of the measuring conduit section 10 may be of the type shown in FIG. 11. FIG. 11 shows a measuring chamber block 90 having a stepped, internally threaded bore having an inner part forming the measuring chamber 91. A measuring electrode which may be of the type well-known in the art, is provided with external threads engaging with the internal threads in the said bore in the block 90. A through bore 94 intersecting the measuring chamber 91 substantially at right angles to the axis of the first mentioned bore forms part of the measuring conduit section 10. At each end of the bore 94 the block 90. A provided with a recess 95 for adopting a sealing ring or sealing gasket of the type shown in FIG. 9.

10. The Photometric Hemoglobin Measuring Device.

Figure 12:
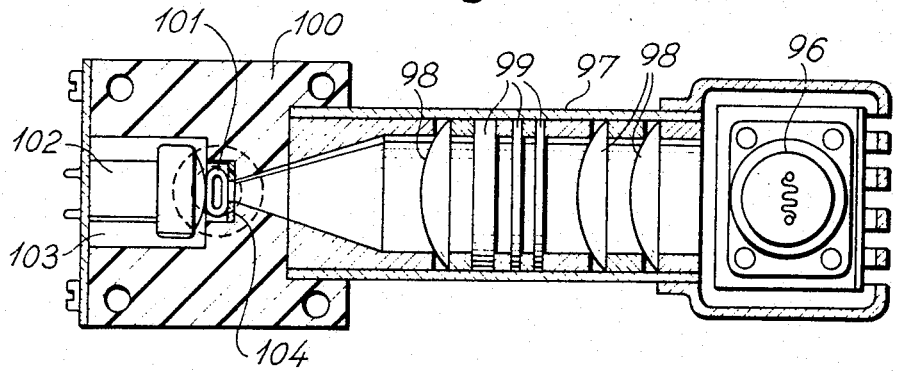
FIG. 12 is a hemoglobin measuring device shown in sectional view.

It has surprisingly been found that the hemoglobin concentration in a blood sample may be measured with sufficient accuracy by means of a photometric measuring device, for example of the type shown in FIG. 12, without homogenizing the blood sample, i.e. on whole blood. The photometric measuring device designated by the numeral 11 in FIG. 2 may for example be of a structure similar to the device shown in FIG. 12. That device comprises a light source 96 emitting a light beam through a tubular member 97 containing aligned planoconvex lenses 98 and light filters 99 positioned therebetween. The tubular member 97 is mounted in block 100 in such a manner that the light beam from the light source 96 is focused on a flattened glass tube 101 forming part of the measuring conduit section 10. A photoelectric cell or photodiode 102 is placed immediately behind the tube 101 within a recess in the block 100 and in alignment with the focusing lenses 98. An annular disc 104 defining a small diaphragm opening is arranged immediately in front of the tube 101.

A normal blood sample contains hemoglobin in as well as oxygenized as in a reduced state. Hemoglobin in these two states has different absorption spectra for most types of light. However, for certain wave lengths — the so-called isobestic points — the light absorption is identical for the two states of hemoglobin. It is, of course, desirable to obtain measurement results being independent of the relative amounts of hemoglobin in the said two states, and therefore the filters 99 are chosen so that the light passing through the glass tube and the blood sample contained therein has a wave length corresponding to an isobestic point. The whole blood within the glass tube 101 will not only absorb the light passing through, but also to a certain extent tend to diffuse the same. In order to reduce light diffusion the diaphragm opening in the disc 104 or light inlet opening is relatively small, and the photodiode 102 is arranged as close to the tube 101 as possible.

11. Detailed Description of Liquid Sensors.

Figure 13:
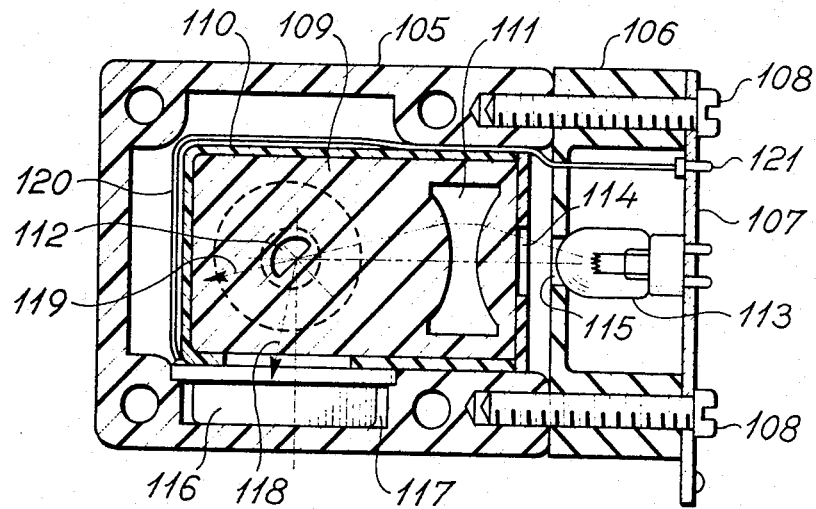
FIG. 13 is a sectional view of a liquid sensor.

The liquid sensors designated 20 and 21 in FIG. 2 may be of any type. However, presently it is preferred to use a type corresponding to that shown in FIG. 13. The function of the liquid sensor shown in FIG. 13 is based on the light reflexion principle, and the liquid sensor may detect the presence of as well transparent as non-transparent liquids.

The liquid sensor shown comprises a housing 105 having a lid part 106 and a cover plate 107 preferably comprising a printed circuit. The parts 105 – 107 are assembled by means of screws 108. The housing 105 contains a block 109 of transparent material, such as styreneacrylonitrile. The block 109 is surrounded by an opaque casing or covering layer 110 and contains a cavity or hollow space 111 shaped as a double concave lens, and a duct or channel 112 having a planoconvex cross-section and forming part of the conduit system in the analyzer. The lid part 106 contains an electrical light source or bulb 113 through openings 114 and 115 in the lid part 106 and the casing 110, respectively, and through the double concave cavity 111 focusing the light beam so that it intersects the plane side of the duct 112. A phototransistor or another photoelectric device 116 is arranged in a recess 117 in the housing 105. The angle between the flat side of the duct 112 and the axis of the double concave cavity 111 is about 45°, and the axis of the photoelectric device 116 intersects the first-mentioned axis at right angles at the said plane of the duct as indicated in FIG. 13. If the duct 112 contains a gas or gas mixture the plane side of the duct reflects light beams from the light source 113 just like a mirror, and the reflected beam 118 hits the photoelectric device 116 which consequently generates a current. If, however, the duct 112 is filled with liquid the light beams will pass the ducts as non-reflected beams 119 which do not hit the phototransistor 116. Thus, the signal from the liquid sensor indicating that a liquid is present in the duct 112 is the absence of electric current from the transistor 116. The said current may be transmitted to the control unit of the blood analyzer through a wire 120 and a terminal 121.

12. Preferred Embodiment of Pumping Devices.

Figure 14:
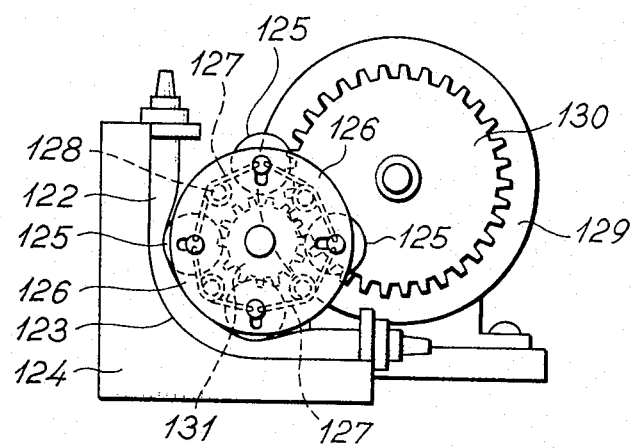
FIG. 14 is a side view of a peristaltic pump.

The pumping devices $P_1$ and $P_2$, see FIG. 2, are preferably of the peristaltic type. An embodiment of the pumping devices is shown in FIG. 14 and comprises a resiliently compressible conduit or hose section 122 mounted on a partly circular supporting surface 123 of a supporting or backing element 124. The hose section 122 cooperates with a number of rotatable rollers 125 having studs or shafts each mounted in a radial slit or a slot in a circular disc 126. The shafts of the rollers 125 are biased radially outwardly in said slots by a number of spring wire members 127. Each spring member is mounted on a pin or stud 128 extending axially from the disc 126 and comprises two arms engaging the adjacent studs or shafts of the rollers 125, whereby these rollers resiliently engage the hose section 122 during rotation of the disc 126. The peristaltic pump may be driven by a motor 129 through gears 130 and 131.

Pumps of the peristaltic type are especially preferred in the analyzer according to the invention inter alia because they do not make the entire surface of the conduit system more complex whereby rinsing is facilitated, and because they function as valves which constantly close their associated conduit section. Thereby a liquid column pumped into the conduit system by a peristaltic pump is prevented from descending when the pump is stopped, even if the conduit system is not of the capillary type.

What is claimed is:

1. A method of analyzing blood, said method comprising the following steps:
   a. passing a blood sample into conduit means provided with measuring devices,
   b. measuring indications of blood parameters by said devices, said parameters comprising pH, $PCO_2$ and $PO_2$,
   c. discharging said blood sample from said conduit means,
   d. passing a rinsing fluid through said conduit means before another sample is passed into it,
   e. passing at controlled intervals and in succession amounts of at least two calibrating fluids having different sets of calibration values of pH, $PCO_2$ and $PO_2$ through said conduit means,
   f. measuring said sets of calibration values with the measuring devices,
   g. controlling the operational sequence of the steps (b) through (f) by control means,
   h. storing said sets of calibration values received from said measuring devices; and (i) converting said measured indications into easily interpreted units on the basis of the calibration values.

2. A method according to claim 1 wherein said parameters being measured further comprise the hemoglobin contents of the blood, the measurement of the hemoglobin contents being performed photometrically on whole blood.

3. A method according to claim 1, wherein the calibrating fluids used comprise a first solution equilibrated with a gas mixture containing known amounts of $O_2$ and $CO_2$, and a second solution equilibrated with a gas mixture containing a known different amount of at least $CO_2$.

4. A method according to claim 3, wherein the gas pressure to which the calibrating fluids are exposed is concurrently measured during measurement of said set of calibration values, the pH, $PO_2$ and $PCO_2$ values of said calibrating fluids being calculated by said computer means on the basis of said concurrently measured gas pressure, the relative amounts of $O_2$ and $CO_2$ in said equilibrating gas mixtures, and the concentration and other known constants of said first and second solutions.

5. A method according to claim 1, wherein said conduit means are flushed with calibrating fluid before measuring said set of calibration values of the respective calibrating fluid.

6. A method according to claim 5, wherein said conduit means are flushed with one of said equilibrating gas mixtures after discharging the corresponding calibrating fluid therefrom and prior to passing another blood sample thereinto.

7. A method in analyzing blood, said method comprising the following steps:
   a. passing a sample of whole blood into conduit means provided with measuring devices comprising measuring electrodes and a photometer device,
   b. measuring indications for the blood parameters pH, $PCO_2$, $PO_2$ and hemoglobin contents by said electrodes and photometer device, respectively, c. discharging said blood sample from said conduit means,
d. passing a rinsing fluid through said conduit means before another sample is passed into it,
e. passing at controlled intervals and in succession amounts at least two calibrating fluids having different sets of calibration values of pH, $PCO_2$ and $PO_2$ through said conduit means,
f. measuring said calibration sets of values by the measuring devices,
g. controlling the operational sequence of the steps (b) through (f) by control means, and
h. storing said sets of calibration values received from said measuring devices; and (i) converting said measured indications into easily interpreted units on the basis of calibration values.

8. A method according to claim 7, wherein the calibrating fluids used comprise a first solution equilibrated with a gas mixture containing known amounts of $O_2$ and $CO_2$, and a second solution equilibrated with a gas mixture containing a different known amount of at least $CO_2$.

9. A method according to claim 8, wherein the gas pressure to which the calibrating fluids are exposed, is concurrently measured during measurement of said set of calibration values, the pH, $PO_2$ and $PCO_2$ values of said calibrating fluids being calculated by said computer means on the basis of said concurrently measured gas pressure, the relative amounts of $O_2$ and $CO_2$ in said equilibrating gas mixtures, and the concentration and other known constants of said first and second solutions.

10. A method according to claim 9, wherein said conduit means are flushed with calibrating fluid before measuring said set of calibration values of the respective calibrating fluid.

11. A method according to claim 10, wherein said conduit means are flushed with one of said equilibrating gas mixtures after discharging the corresponding calibrating fluid therefrom and prior to passing another blood sample thereinto.

12. An automatic blood sample analyzer comprising:
a. conduit means having a blood sample inlet section and a measuring section, said measuring section including self-operated means for measuring at least one parameter of a blood sample,
b. means for discharging the blood sample from the measuring section when measurements have been performed by said measuring means,
c. rinsing fluid storage means,
d. means for flowing rinsing fluid from said storage means through said measuring and inlet conduit sections,
e. calibrating fluid storage means,
f. means for flowing amounts of calibrating fluids from said storage means into said measuring section,
g. means for discharging said amounts of calibrating fluids from the measuring section, and
h. self-operated control means including computer means for automatically controlling the operational sequence of said flow means and discharge means, and for automatically converting the parameters of a fluid measured by said measuring means to values based on calibration values obtained by measuring the parameters of said calibrating fluids in said measuring section.

13. An automatic blood sample analyzer according to claim 12, wherein said means for moving, calibrating and rinsing fluid and said means for discharging blood and calibrating fluid comprise pumping means.

14. An automatic blood sample analyzer according to claim 12, wherein said measuring means comprise electrodes for measuring pH, $PO_2$, and $PCO_2$ of blood samples.

15. An automatic blood sample analyzer according to claim 14, wherein said measuring means further comprise photometric means for measuring the hemoglobin content of the blood sample.

16. An automatic blood sampler analyzer according to claim 14, wherein said calibrating fluid storage means comprise two storage containers for calibrating liquids and means for equilibrating said calibrating liquids with gas mixtures of known composition.

17. An automatic blood sample analyzer according to claim 12, further comprising means for flowing an amount of blood from said inlet section into said measuring section.

18. An automatic blood sample analyzer according to claim 17, wherein said inlet section comprises walls having transparent portions.

19. An automatic blood sample analyzer according to claim 17, wherein said conduit means further comprise a drainage section, said inlet section comprising a transitional storage chamber to which said drainage section is connected.

20. An automatic blood sample analyzer according to claim 19, wherein said transitional storage chamber comprises transparent wall parts.

21. An automatic blood sample analyser according to claim 19, wherein said conduit means further comprise a shunt section connecting said drainage section and an end portion of the inlet section, the part of the shunt section adjacent to the inlet end portion comprising a moveable part movable between a closed position in which said movable part communicates with the inlet end portion, and an open position, in which the shunt section is separated from the inlet end portion.

22. An automatic blood sample analyzer according to claim 21, further comprising switch means for starting the operational sequence of the analyzer, said switch means comprising means operated by moving said movable part of the shunt section.

23. An automatic blood sample analyzer according to claim 21, wherein said movable part of the shunt section comprises an enlarged end portion which in the closed position of said movable part surrounds the free end of said inlet end portion in spaced relation and is in tight engagement with a shoulder on said inlet end portion.

24. An automatic blood sample analyzer according to claim 19, further comprising liquid sensors applying signals to the control and computer means for controlling means for passing blood from the inlet section into the measuring section, said sensors being arranged downstream of said transitional storage container and said measuring means.

25. An automatic blood sample analyzer according to claim 14, and further comprising temperature control means for maintaining said measuring section and said fluid storage means at a substantially constant temperature.

26. An automatic blood sample analyzer according to claim 25, wherein said control means comprise air heating and air circulating means.

27. An automatic blood sample analyzer according to claim 25, wherein said temperature control means comprise heat accumulating means for heating a blood sample passing through said inlet section.

28. An automatic blood sample analyzer according to claim 19, wherein said inlet and measuring sections are arranged in an upright position.

29. An automatic blood sample analyzer according to claim 16, further comprising means for measuring gas pressure in said fluid storage means and including a transducer for converting the measured pressure values into electrical signals to be transmitted to said control and computer means.

30. An automatic blood sample analyzer comprising:
   a. conduit means having a blood sample inlet section and a measuring section, said measuring section having self-operated measuring means including electrodes for measuring indications for pH, $PO_2$ and $PCO_2$, and a photometer device for measuring the hemoglobin contents of a sample of whole blood,
   b. means for discharging said blood sample from the measuring section when measurements have been performed by said measuring means,
   c. rinsing fluid storage means,
   d. means for flowing rinsing fluid from said storage means through said measuring and inlet conduit sections,
   e. calibrating fluid storage means,
   f. means for flowing amounts of calibrating fluids from said storage means into said measuring section,
   g. means for discharging said amounts of calibrating fluids from the measuring section, and
   h. self-operated control means including computer means for automatically controlling the operational sequence of said flow means and discharge means, and for automatically converting the indications measured by said measuring means to values based on calibration values obtained by measuring the corresponding indications for said calibrating fluids in said measuring section.

31. An automatic blood sample analyzer according to claim 30, wherein said calibrating fluid storage means comprise two storage containers for calibrating liquids and means for equilibrating said calibrating liquids with gas mixtures of known composition.

32. An automatic blood sample analyzer according to claim 31, further comprising means for flowing a sample of blood from said inlet section into said measuring section.

33. An automatic blood sample analyzer according to claim 32, wherein said means for flowing calibrating and rinsing fluid and said means for moving and discharging blood and calibrating fluid comprise common pumping means.

34. An automatic blood sample analyzer according to claim 33, wherein said inlet section comprises walls having transparent portions.

35. An automatic blood sample analyzer according to claim 33, wherein said conduit means further comprise a drainage section, said inlet section comprising a transitional storage chamber to which said drainage section is connected.

36. An automatic blood sample analyzer according to claim 35, wherein said transitional storage chamber comprises walls having transparent portions.

37. An automatic blood sample analyzer according to claim 35, wherein said conduit means further comprise a shunt section connecting said drainage section and an end portion of the inlet section, the part of the shunt section adjacent to the inlet end portion comprising a movable part movable between a closed position in which said movable part communicates with the inlet end portion, and an open position in which the shunt section is separated from the inlet end portion.

38. An automatic blood sample analyzer according to claim 37, further comprising switch means for starting the operational sequence of the analyzer, said switch means comprising means operated by moving said mavable part of the shunt section.

39. An automatic blood sample analyzer according to claim 37, wherein said movable part of the shunt section comprises an enlarged end portion which in the closed position of said movable part surrounds the free end of said inlet end portion in spaced relation and is in tight engagement with a shoulder on said inlet end portion.

40. An automatic blood sample analyzer according to claim 35, further comprising blood sensors for applying signals to the control and computer means for controlling the means for passing blood from the inlet section into the measuring section, said sensors being arranged downstream of said transitional storage container and said measuring means.

41. An automatic blood sample analyzer according to claim 31 and further comprising temperature control means for maintaining said measuring section and said fluid storage means at a substantially constant temperature.

42. An automatic blood sample analyzer according to claim 41, wherein said control means comprise air heating and air circulating means.

43. An automatic blood sample analyzer according to claim 41, wherein said temperature control means comprise heat accumulating means for heating a blood sample passing through said inlet section.

44. An automatic blood sample analyzer according to claim 35, wherein said inlet and measuring sections are arranged in an upright position.

45. An automatic blood sample analyzer according to claim 31 further comprising means for measuring gas pressure in said storage containers and including a transducer for converting the measured pressure values into electrical signals to be transmitted to said control and computer means.

46. An apparatus for measuring indications for blood parameters including pH, $PO_2$, and $PCO_2$, said apparatus comprising:
   a. electrodes for measuring indications of blood parameters and converting them into electrical signals,
   b. self-operated calibrating means for use in calibrating said measuring electrodes, said calibrating means comprising means for equilibrating first and second calibrating liquids with different gas mixtures of known composition,
   c. self-operated means for moving said equilibrated calibrating fluids separately and at intervals into contact with said electrodes so as to enable said electrodes to perform calibration measurements thereon, and d. computer means for converting said measured indications into easily conceivable units, said computer means comprising means to store calibrating measurement signals received from said electrodes and to base the conversion of measured indications on the stored calibrating measurement signals.

47. An apparatus according to claim 46, further comprising means for measuring the gas pressure above said equilibrated calibrating liquids, and a transducer for converting the measured pressure values into electrical signals, said computer means comprising means to store electrical signals received from said transducer and to base the conversion of measured indications thereon.

48. An apparatus according to claim 46, further comprising photometric means for measuring the hemoglobin contents of a sample of whole blood.

* * * * *